(12) United States Patent
Bischoff (10) Patent No.: US 10,190,239 B2
(45) Date of Patent: Jan. 29, 2019

(54) TEXTILE PART, COMPOSITE MATERIAL ELEMENT WITH TEXTILE PART, AND PRODUCTION METHOD FOR THE SAME

(71) Applicant: GROZ-BECKERT KG, Albstadt (DE)

(72) Inventor: Thomas Bischoff, Bisingen (DE)

(73) Assignee: Groz-Beckert KG, Albstadt (DE)

( * ) Notice: Subject to any disclaimer, the term of this patent is extended or adjusted under 35 U.S.C. 154(b) by 708 days.

(21) Appl. No.: 14/400,477

(22) PCT Filed: Apr. 18, 2013

(86) PCT No.: PCT/EP2013/058127
§ 371 (c)(1),
(2) Date: Nov. 11, 2014

(87) PCT Pub. No.: WO2013/167362
PCT Pub. Date: Nov. 14, 2013

(65) Prior Publication Data
US 2015/0167208 A1 Jun. 18, 2015

(30) Foreign Application Priority Data
May 11, 2012 (EP) .................................... 12167731

(51) Int. Cl.
*D03D 13/00* (2006.01)
*D03D 15/00* (2006.01)
(Continued)

(52) U.S. Cl.
CPC ....... *D03D 13/006* (2013.01); *B29C 45/0005* (2013.01); *B29C 70/22* (2013.01);
(Continued)

(58) Field of Classification Search
USPC .................................. 442/181; 428/102, 107
See application file for complete search history.

(56) References Cited

U.S. PATENT DOCUMENTS

| 4,320,160 A | 3/1982 | Nishimura et al. |
| 5,952,067 A | 9/1999 | Head |

(Continued)

FOREIGN PATENT DOCUMENTS

| DE | 202005014801 U1 | 11/2005 |
| DE | 102005022567 A1 | 11/2006 |

(Continued)

OTHER PUBLICATIONS

International Search Report for corresponding PCT/EP2013/058127, dated May 29, 2013.
(Continued)

*Primary Examiner* — Lynda Salvatore
(74) *Attorney, Agent, or Firm* — Fitch, Even, Tabin & Flannery LLP (57) ABSTRACT

A textile part is configured for producing a composite-material element (11) or a composite-material body (12). The textile part (10) has a reinforcing system (15) including reinforcing warp threads (16) and reinforcing weft threads (17), and a binding system (25) with binding warp threads (27) and binding weft threads (26). The reinforcing system (15) has at least one first portion (20), into which the reinforcing threads (16, 17) are interwoven with one another directly for binding to facilitate withstanding high mechanical. The reinforcing system (15) also has at least one second portion (21), in which the reinforcing threads (16, 17) form binding-free crossover locations (22) preferably laid on one another in a drawn-out state to constitute a laid structure surrounded by the binding threads (26, 27). The laid structure of the reinforcing system (15), ensures particularly good draping and deformation capability at this location of the composite material.

16 Claims, 6 Drawing Sheets

(51) Int. Cl.
*D03D 19/00* (2006.01)
*B29C 45/00* (2006.01)
*B29C 70/22* (2006.01)
*B29C 70/46* (2006.01)
*B29B 11/16* (2006.01)

(52) U.S. Cl.
CPC ............ *B29C 70/46* (2013.01); *D03D 15/00* (2013.01); *D03D 15/0027* (2013.01); *D03D 15/0094* (2013.01); *D03D 19/00* (2013.01); *B29B 11/16* (2013.01); *D10B 2505/02* (2013.01); *Y10T 442/20* (2015.04); *Y10T 442/3179* (2015.04)

(56) References Cited

U.S. PATENT DOCUMENTS

| | | | |
|---|---|---|---|
| 7,467,646 | B2 | 12/2008 | Mettler et al. |
| 7,918,249 | B2 | 4/2011 | Moser |

FOREIGN PATENT DOCUMENTS

| | | |
|---|---|---|
| EP | 0408830 A1 | 1/1991 |
| EP | 1743537 A1 | 1/2007 |
| EP | 1795636 A1 | 6/2007 |
| EP | 2063007 A1 | 5/2009 |
| GB | 1082684 A | 9/1967 |
| JP | H01232019 A | 9/1989 |
| JP | H08230055 A | 9/1996 |
| JP | H11117138 A | 4/1999 |
| JP | 2008013886 A | 1/2008 |
| JP | 2008127477 A | 6/2008 |
| WO | 2006122752 A1 | 11/2006 |

OTHER PUBLICATIONS

Office action and search report in corresponding Chinese application No. 201380036802.1, dated Dec. 28, 2015.
Second office action in corresponding Chinese application No. 201380036802.1, dated Sep. 2, 2016, 8 pages.
Search report and written opinion in corresponding European application No. 12 16 7731, dated Sep. 26, 2012, 7 pages.
Notification of Reasons for Rejection in corresponding Japanese Application No. 2015-510708, dated May 23, 2017, 7 pages.

TEXTILE PART, COMPOSITE MATERIAL ELEMENT WITH TEXTILE PART, AND PRODUCTION METHOD FOR THE SAME

CROSS REFERENCE TO RELATED APPLICATIONS

This patent application is the national phase of PCT/EP2013/058127 filed Apr. 18, 2013, which claims the benefit of European Patent Application No. EP 12167731.4 filed May 11, 2012.

TECHNICAL FIELD

The invention relates to a textile part, a composite material element with such a textile part, as well as to a method for the production of the textile part and of the composite material element.

BACKGROUND

The textile part is intended for the use in composite materials that may also be referred to as composites. Such textile-reinforced composite materials have been basically known.

In conventionally woven textile parts a thread convolution is formed due to the binding of warp threads with weft threads so that, when the textile part is used in a composite material element, a non-ideally drawn out orientation of the threads exists. The textile part that is used for reinforcing the composite material and forms a textile layer thus comprises convoluted threads. The achievable strength of the composite material element is thus not optimal. Therefore, kinks, convolutions or small radii should be avoided if at all possible.

By increasing the distances between the binding locations the number and height of the convolutions in the affected thread can indeed be reduced. This means that larger floats are provided, which also increases the drapability of the textile part. However, with extremely large floats there arises the disadvantage that undesirable shifting of the threads of the textile part can occur when it is being draped and, in particular, when the textile part is being moulded into a three-dimensional composite material body. As a result of this, the thread density may be insufficiently low in some places while it is too high in other places.

Instead of woven fabrics it is also possible to use non-woven layers of reinforcing threads as the textile part. Considering these laid structures, however, it is necessary that the reinforcing threads be fused together by an additional means. Indeed, such non-wovens have the disadvantage that some mechanical laminate properties become worse, e.g., perpendicular to the extension plane of the textile part, namely the sliding properties, the properties of the face of a hole, the impact stress properties or the damage-free mechanical processability of the textile part or the composite material element produced therefrom. Inasmuch as there is no typical woven binding between the threads of the textile part, the mechanical properties perpendicular to the extension plane are frequently not adequate.

Another aspect considering the embodiment and production and processing of a textile part, in particular considering the production of a composite material element, is the drapability during a reshaping process. In doing so, the composite material elements can be heated and mechanically reshaped. In transfer moulding it is also possible to form a so-called preliminary form—also referred to as a preform—from the textile part that has been imparted with the desired shape and to produce a composite material body, for example by the injection of liquid resin under high pressure. When a composite material element is being reshaped or when a textile part is being draped, it is not desirable for the threads or fibers to flow and shift in an uncontrolled manner. Considering this method, a laid structure has the advantage that it is indeed highly drapable, however, considering a non-woven, there is the risk that the means for binding the laid structure are not sufficiently firm and that thus the desired thread density is lost in certain areas. On the other hand, woven structures are less drapable and thus harder to reshape.

Publication U.S. Pat. No. 4,320,160 discloses a textile part for composite material bodies. This textile part comprises a reinforcing system of reinforcing threads placed adjacent each other, said threads being bound to each other by binding threads. The bindings threads used are binding warp threads and binding weft threads bound to each other by simple weft threads, or the binding warp threads are bound with the reinforcing warp threads and the reinforcing weft threads, respectively. This textile part has the disadvantage that, based on the suggested binding types, the thread tension of the binding threads must be low in order to avoid undesirable convolutions of the reinforcing threads. This, in turn, has the result that sufficient resistance to a shifting of the reinforcing threads is not ensured. When the desired resistance to shifting is attained, the thread tension of the binding threads causes a convolution of the reinforcing threads, on the one hand, and there is the risk of the reinforcing threads being bundled due to the high thread tension of the binding thread between the binding locations and of an undesirable structure with very uneven thread density of the reinforcing threads, on the other hand.

Publication DE 20 2005 014 801 U1 also discloses a textile part with a reinforcing system of reinforcing threads and a binding system of binding threads for binding the reinforcing system, whereby this implies the same disadvantages that have been described in conjunction with publication U.S. Pat. No. 4,320,160

Publication 10 2005 022 567 A1 describes a planar textile structure that, in a described exemplary embodiment, uses leno weave as well as linen weave between reinforcing threads. For example, after a prespecified number of linen weave bindings, a leno weave binding may always be provided.

Assuming this, it may be viewed as the object of the present invention to provide a textile part, a composite material element with such a textile part, as well as a production method, wherein good handlability in the course of shaping and reshaping of the textile part and the composite material element, respectively is ensured, on the one hand, and sufficient mechanical stability exists, on the other hand.

SUMMARY

The textile part according to the invention comprises a reinforcing system of reinforcing weft threads and reinforcing warp threads. Furthermore, one modification according to the invention comprises a binding system of binding weft threads and binding warp threads. In at least one first portion, the reinforcing system forms a fabric with conventional binding between the reinforcing weft threads and the reinforcing warp threads, for example a linen weave, twill weave, satin weave, leno weave or the like.

Furthermore, the textile part has a second portion in which the reinforcing weft threads and the reinforcing warp threads directly abut each other without any direct binding. In this second portion, the reinforcing warp threads and the reinforcing weft threads are drawn out.

In order to set the reinforcing threads in the second portion, whereby said second portion—in a first modification according to the invention—can be edged on several sides in warp thread direction and/or in weft thread direction, for example on two opposite sides in warp thread direction or on two opposite sides in weft thread direction, by one or respectively by a first portion, and thus be stabilized or fixed in position. A particular good fixation or stabilization is achieved if this second portion is edged all around on all four sides by one or more first portions.

In a second modification according to the invention that can be implemented alternatively or additionally to the first modification a binding system is provided. The reinforcing threads are held by the binding system in that the binding weft threads and the binding warp threads border the reinforcing system on opposite sides that form a binding at the binding locations, i.e., together and/or with the reinforcing system.

The first as well as the second portion preferably comprise adjacent reinforcing warp threads and, respectively, several adjacently arranged reinforcing weft threads, so that the two portions have a planar configuration.

As a result of the embodiment of the textile part according to the invention, regions of high drapability are formed, in which regions the reinforcing threads of the reinforcing system form a laid structure and are secured against undesirable shifting by the adjacent first sections of the textile part and/or by the binding system. The laid structure of reinforcing threads in the at least one second portion and the woven structure of reinforcing threads in the at least one first portion are arranged next to each other in one extension direction in the non-deformed textile part. The extension plane is defined by the warp thread direction and the weft thread direction.

Preferably, the binding locations of the binding system, provided there is one, are formed in this second portion by a leno weave, for example a half leno binding or a full leno binding. In the at least one first portion of the textile part, the reinforcing threads of the reinforcing system are bound directly in a weave and thus form a woven structure. In this first portion, the reinforcing threads are secured well against shifting, and the textile part exhibits high mechanical stability perpendicular to the textile plane. The binding weft threads as well as the binding warp threads in this first portion may extend, for example, without changing sides on one side of the reinforcing system. Alternatively, the binding system may additionally edge and stabilize the reinforcing system in the first portion.

This textile part according to the invention is particularly suitable for the production of in particular sheet-shaped composite material elements or three-dimensionally shaped composite material bodies. Such a composite material element or such a composite material body—adapted to its use—displays, in the region of the first portion of the textile part, a very high mechanical strength, even perpendicular to the area of the composite material element. The at least one second portion is provided in the at least one region, in which the composite material is to be reshaped or is reshaped. The high drapability in this region allows it to be reshaped in a simple manner. In this second portion, the binding system can secure the reinforcing system so that the reinforcing threads will not be displaced. Additionally or alternatively, the textile part may have several first portions enclosing this second portion. Consequently, an additional restriction of shifting of the reinforcing threads in the second portion can be achieved. The reinforcing threads in the second portion are thus secured by the binding system and/or by the formation of a weave of the reinforcing threads in the adjacent first portion. By positioning the at least one first portion and the at least one second portion, the textile part can be easily adapted to the requirements in the composite material.

Preferably, the second portion comprising binding locations at which two directly adjacent warp threads, for example two binding warp threads or one binding warp thread and one reinforcing warp thread form a warp thread pair of one stationary warp thread and one leno warp thread. In accordance with the example, the stationary warp thread and the leno warp thread cross several times and include a binding weft thread at the binding location. Due to such a full or half leno binding, the reinforcing threads in the second portion are particularly well secured against any inadvertent shifting while the textile part or the composite material element is being draped or reshaped.

Preferably, the binding threads, i.e., the binding warp threads as well as the binding weft threads, in the at least first portion are arranged only on one side of the reinforcing system, so that they do not edge the reinforcing system but abut from one side against the reinforcing system. At all times, the binding weft threads may extend only on one side of the reinforcing system or may change the side during the transition from a first portion to a second portion.

It is advantageous if, in a leno binding in the binding system, the at least one crossover location between the warp thread pair comprising the stationary warp thread and the leno warp thread in the second portion of the textile part is located directly at the binding location with the binding weft thread. Inasmuch as, at the binding location, the threads of the binding system extend through between the threads of the reinforcing system, i.e. penetrate the reinforcing system, as it were, the distance that is already required between adjacent reinforcing warp threads and the adjacent reinforcing weft threads, respectively, can be used in order to provide, at this location, the at least one crossover location of the stationary warp thread with the leno warp thread.

Preferably, the binding warp threads extend crossover-free with respect to the reinforcing warp threads. Consequently, all warp threads extend parallel in one warp thread direction. Preferably, the binding weft threads extend crossover-free with respect to the reinforcing weft threads. Consequently, all weft threads run parallel in one weft thread direction that is oriented approximately at a right angle relative to the warp thread direction. Therefore, the textile part can be produced in a very simple manner on a conventional weaving machine or on a jacquard machine.

In a preferred embodiment of the textile part, the number of crossover locations in the at least one second portion between the reinforcing warp threads and the reinforcing weft threads is the same or greater than the number of binding locations of the binding system in this at least one second portion. In the exemplary embodiment, the number of weft threads per unit of length (thread density) may be smaller in at least the second portion for the binding weft threads than for the reinforcing weft threads. With the use of a leno weave for the binding system, the number of binding warp thread pairs of stationary warp threads and of leno warp threads per unit of length may be at most as great as the number of reinforcing warp threads. The distance between binding locations in the binding system may be selected so as to be different in warp thread direction and in weft thread direction. The distance between the binding locations may vary in warp thread direction and also in weft thread direction so that zones with tightly arranged binding locations and zones with less tightly arranged binding locations are formed, and thus the shifting resistance of the reinforcing threads within the at least one second portion varies from zone to zone. If a higher drapability of the at least one second portion is desired, the size and length of the float in the binding system can be increased accordingly.

A reinforcing yarn is selected, in particular, for the reinforcing weft threads and the reinforcing warp threads, said reinforcing yarn being different from the binding yarn of which the binding warp threads and the binding weft threads are made. Mainly the reinforcing threads of the reinforcing system are responsible for the mechanical stiffness or strength of the composite material element that is produced with the use of the textile part. The reinforcing yarn may contain carbon fibers and/or aramid fibers and/or glass fibers, for example. In one exemplary embodiment, the reinforcing threads may have a planar cross-section having a width that is greater in the extension plane of the textile part than in the height transversely to the extension plane of the textile part. Different therefrom, it is possible to select the cross-section of the binding yarn to be preferably circular. The titer or the cross-section of the binding yarn is specifically smaller than the titer or the cross-section of the reinforcing yarn. The titer of the reinforcing yarn is preferably at least 500 dtex. The titer of the binding yarn is preferably lower than 500 dtex, in particular at most 100 dtex, and further preferably, at most 50 dtex. Consequently, the mass portion of the binding yarn can be kept small compared to that of the reinforcing yarn in the textile part. In addition, the need for space between two adjacent reinforcing threads of the reinforcing system is small, such space being required by one binding weft thread or one binding warp thread. The mechanical stressability, in particular, the tensile load capacity of the reinforcing yarn for the reinforcing threads is greater than the load capacity of the binding yarn for the binding threads.

Binding yarns that can be considered are PES or phenoxy yarns such as, for example, Grilon MS® by EMS Chemie. However, it is also possible to use other yarns, in particular bonding yarns such as, for example copolyester yarns or thermoplastic yarns such as, e.g., PA. Preferably, the binding yarn consists partially or fully of a synthetic material that corresponds to the plastic matrix of the composite material element.

In a preferred embodiment, the binding yarn is made of a material that binds well and substantially completely with the plastic material of the composite material when the composite material element is produced. The material of the binding yarn may be selected dependent on the plastic material of the composite material. In particular, the binding yarn contains a material having a melting temperature that is at most as high as the temperature that prevails during the production of the composite material element or the composite material body, so that a fusion between the binding yarn and the plastic material of the composite material takes place.

Preferably, the titer of the binding yarn is determined in such a manner that the interlaminary shearing strength of the composite material or the composite material body to be produced deviates from a nominal value prespecified by the reinforcing system at most by a prespecified tolerance value. For example, the mass percentage of the binding yarn in the binding system can be prespecified in such a manner that the interlaminary shearing strength achieved by the reinforcing system alone deviates at most by a tolerance value of 5%, for example. This may be of importance in particular when the binding yarn that is used cannot or only poorly bond with the plastic material of the composite material to be produced.

In one advantageous embodiment, the binding yarn comprises a core and a coat enclosing said core. The core and the coat are preferably made of different materials. In particular, the melting temperature of the coat is lower than the melting temperature of the core. Preferably, the coat consists of plastic material. Therefore, the hot-melt adhesive properties of the binding yarn can be activated by melting the coat, without the core losing its stability or structure.

With the use of bonding yarns or yarns having a core or a coat displaying different melting temperatures, a simple production of preforms is given. The textile part can be formed into the desired drape and, subsequently, the hot-melt adhesive properties of the binding yarn can be activated, in particular due to the effect of radiation, for example, thermal radiation. The use of binding agents for fixing the binding yarns in place in a three-dimensional form of the textile part is alternatively or additionally possible, however, may be omitted in the case of binding yarns exhibiting bonding properties because the binding yarns already assume the fixing function.

The textile part is particularly suitable for the production of a composite material element. Such a composite material element has a textile portion that forms a textile layer as well as a plastic matrix that is bonded to the textile layer. To do so, it is possible for example, to bond a plastic film to the textile layer, in particular by thermal action and/or pressure action. The composite material element may also comprise several textile layers. The plastic matrix can be produced by bonding at least one plastic film to at least one textile part or by introducing flowable plastic material into a mould accommodating the textile part. For example, the at least one textile part can first be draped into the shape corresponding to the later to be produced composite material element. Optionally, in doing so, several textile parts are layered. The reinforcing threads are oriented into the desired direction. The resultant preform can be set to maintain its shape, for example, with a binding agent or by activation of the hot-meld adhesive properties of the binding yarn and/or reinforcing yarn. The preform is placed in a mould into which, subsequently, flowable plastic material or resin is injected. After curing the plastic material has cured, the composite material element can be removed from the mould. The at least second portion with the laid structure of the reinforcing threads ensures good drapability while the at least one first portion with the woven reinforcing threads bonds the at least one second portion and/or the binding system. When the plastic material is introduced into the mould, an inadvertent shifting or slipping of the reinforcing threads in the at least one second portion is avoided or at least minimized.

Such a textile part can be produced on a weaving machine. To do so, the reinforcing weft threads and the binding weft threads are successively inserted or interleaved in a prespecified sequence. During the weft insertion with a reinforcing weft thread, the reinforcing warp threads that extend through the at least one first portion are located in the upper shed or in the lower shed, regardless of the binding type. The reinforcing warp threads that extend through one at least second portion are always located in the same shed—either in the upper shed or in the lower shed. In this manner, a woven structure is produced between the reinforcing threads in the first portion and a laid structure is produced between the reinforcing threads in the second position.

In the course of a weft insertion with a binding weft thread, the reinforcing warp threads extending through the at least one second portion are always in the same shed—either in the upper shed or in the lower shed—while at least one part of the binding warp threads extending through this second portion is located in the respectively other shed. As a result of this, the edging of the reinforcing system in the second portion is achieved between the binding warp threads and the binding weft threads.

BRIEF DESCRIPTION OF THE DRAWINGS

Additional advantageous embodiments of the invention can be inferred from the dependent patent claims as well as from the description. The description is restricted to essential features of the invention. The drawing is to be used for supplementary reference. Hereinafter, exemplary embodiments are explained with reference to the appended drawings. They show in FIGS. 1 through 4 schematic plan views of respectively one exemplary embodiment of a first portion as well as of a second portion of a textile part;

DETAILED DESCRIPTION

Each of the FIGS. 1 through 4 shows an extremely schematic structure of a textile part 10. The textile part 10 is used, in particular, for the production of a composite material element 11 of a composite material body 12 having a textile layer 13 that is formed by a textile part 10.

Figures 7, 8:
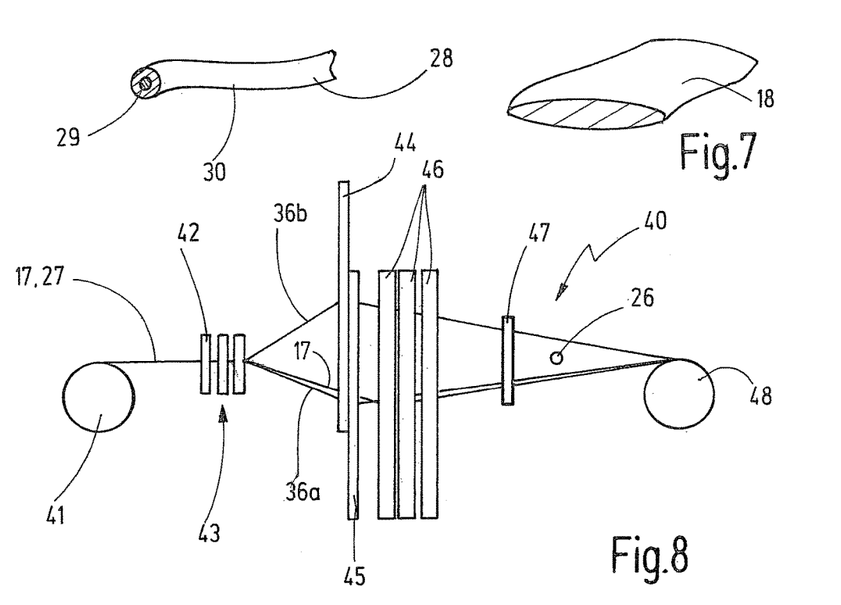
FIG. 7 a schematic diagram of a binding yarn for the binding threads and of a reinforcing yarn for the reinforcing threads.
FIG. 8 a schematic representation resembling a block circuit diagram of a weaving machine during the insertion of a binding weft thread.

The textile part 10 comprises a reinforcing system 15 with reinforcing weft threads 16 and reinforcing warp threads 17 that are made of a reinforcing yarn 18. FIG. 7 is a schematic representation of the reinforcing yarn 18 and has a planar cross-section with an oval or ellipse-like contour. By means of the reinforcing yarn 18, the composite material body 12 comprising the textile part 10 or the composite material element 11 comprising the textile part 10, the textile part is imparted with the desired mechanical properties such as, e.g., the desired mechanical strength and stiffness. Instead of a planar cross-section, the reinforcing yarn 18 could also have a substantially circular cross-section.

The reinforcing yarn 18 may contain carbon fibers, aramid fibers or glass fibers or consist of such fibers. Alternatively, it is also possible to embody the reinforcing yarn 18 as a so-called roving, wherein a plurality of individual fibers are not twilled and arranged parallel to each other.

The reinforcing threads 17 consisting of the reinforcing yarn 18, as well as the reinforcing weft threads 16, form—in at least one portion 20 of the textile part 10—a woven structure and—in at least a second portion 21 of the textile part 10—a laid structure. the reinforcing weft threads 16 and the reinforcing warp threads 17 that extend through the first portion 20 are directly woven to each other, preferably using a common weave such as a the linen weave, twill weave, satin weave or leno weave. FIGS. 1 through 4 show the example of a linen weave in the first portion 20. In the second portion 21, the reinforcing weft threads, as well as the reinforcing warp threads 17, are drawn out and are not bound directly to each other. The reinforcing weft threads 16 abut against the reinforcing warp threads 17 in the second portion 21. The reinforcing threads 16, 17 form binding-free crossover locations 22 in the portion 21. The distance between adjacent reinforcing weft threads 16 and the distance between adjacent reinforcing warp threads 17 depends—in the first portion 20 as well as also in the second portion 21—on the desired mechanical properties of the composite material element 11 produced with the use of the textile part 10.

The number of the first portions 20 and the second portions 21 of the textile part 10 may be as desired. The arrangement and the number of existing first portions 20 and second portions 21 is selected in such a manner that the composite material element 11 or the composite material body 17 produced therewith comprises 12 zones displaying high mechanical strength in view of the weave-typical binding and zones displaying high drapability and mechanical properties in the extension plane ("in-plane" properties) of the reinforcing threads. In the zones displaying high drapability, the textile part 10 has a second portion 21 while, in the zones displaying high mechanical strength, said textile part has a first portion 20.

In order to avoid undesirably strong shifting of the reinforcing threads 16, 17 in the at least one second portion 21 when a textile part 10 is being reshaped during the production of a preliminary form (also referred to as preform) or of a composite material element, or also when a composite material element 11 produced with the use of the textile part 10 is being reshaped, the textile part 10 comprises a binding system 25 according to the example.

Referring to an alternative, not illustrated, modification, the reinforcing threads 16, 17 can be secured in the at least one second portion 21, alone or in addition to the binding system 25, by means of the at least one adjacent first portion 20 in order to prevent shifting. In doing so, for example, the at least one first portion 20 adjoins the second portion 21 from several sides in the first extension plane of the textile part 10. The extension plane of the textile part 10 is defined by the warp thread direction K and/or the weft thread direction S. After the textile part 10 has been reshaped, the extension plane can become a curved area.

The binding system 25 comprises binding weft threads 26 and binding warp threads 27. The binding threads 26, 27 are made of a binding yarn 28, in which case FIG. 7 shows one exemplary embodiment of the binding yarn having a core 29 and a coat 30. In the exemplary embodiment, the binding yarn has an essentially circular cross-section. This cross-section is smaller than the cross-section of the reinforcing yarn 18. Preferably, the binding yarn has a titer of less than 500 dtex, in particular at most 100 dtex, or at most 50 dtex. Considering the embodiment shown by FIG. 7, the binding yarn 28 displays hot-melt adhesive properties that, according to the example, are attained due to the coat 30. The coat 30 encloses the core 29 in coaxial direction. The melting temperature of the coat 30 is lower than the melting temperature of the core 29. During the production of the composite material element 11 or the composite material body 12, the hot-melt adhesive properties of the coat 30 and thus those of the binding yarn 28 are activated, as a result of which a fusion of the binding yarns 28 with the reinforcing yarns 18 of the textile part 10 is achieved. Consequently, it is also possible to impart the textile part 10 with a desired three-dimensional form prior to the production of a composite material and to produce a preliminary form or preform.

The binding warp threads 27, as well as the reinforcing warp threads 17, extend in a warp thread direction K and, in the exemplary embodiment, they extend next to each without crossovers. The reinforcing weft threads 16 and the binding weft threads 26 extend in a weft thread direction S, and in the exemplary embodiment, they extent next to each other without crossovers.

At least in the at least one second portion 21 of the textile part 10, the binding warp threads 27 and the binding weft threads 26 edge the reinforcing system 15 in order to secure the reinforcing threads 16, 17 in this second portion 21 against inadvertent shifting. In doing so, the binding weft threads 26 extend on one side of the binding system 15 while the binding warp threads 27 are arranged on the respectively other side of the reinforcing system 15. At the binding locations 35, the binding weft threads 26 are connected to the binding warp threads 27 by means of a woven binding. The non-woven structure of reinforcing weft threads 16 and reinforcing warp threads 16 in the second portion 21 is thus secured against extreme movements in warp thread direction K or in weft thread direction S.

Figure 4:
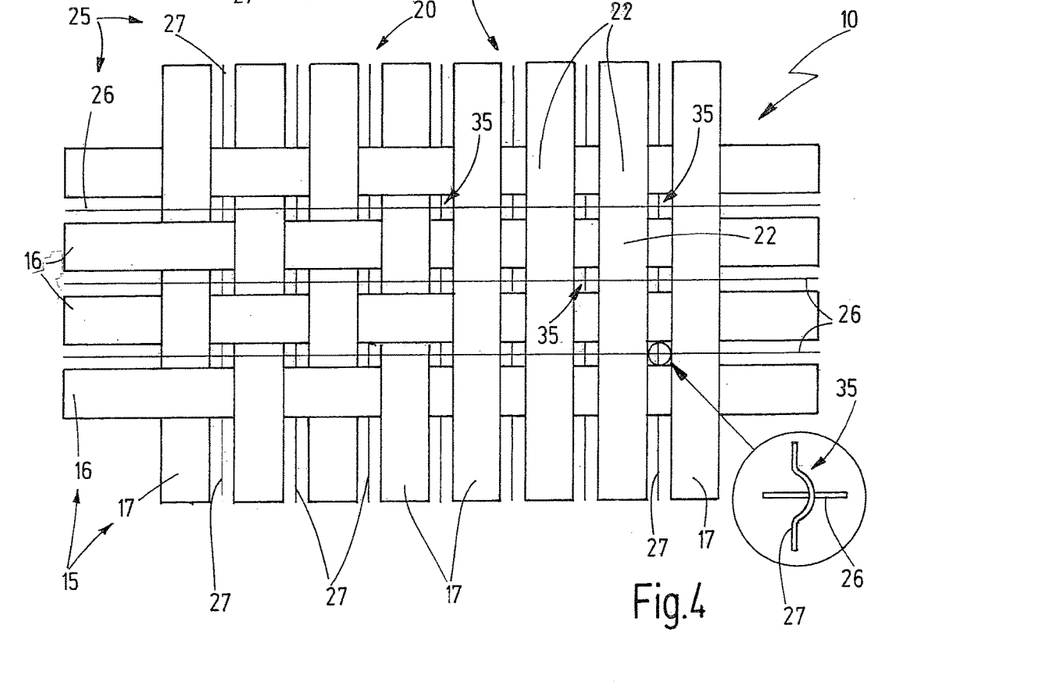

Referring to an exemplary embodiment as in FIG. 4, a simple binding is provided between one binding warp thread 27 and one binding weft thread 26 at a binding location 35. At the binding location 35, the binding warp thread 27 extends over the binding weft thread 26. Referring to the embodiments shown by FIGS. 1 through 3, a full leno binding or a half leno binding is provided at the binding locations 35 of the binding system 25. To do so, preferably two binding warp threads 27 each extend directly adjacent between two binding reinforcing threads 17. This warp thread pair 36 comprises a leno warp thread 36a and a stationary warp thread 36b, each being formed by respectively one binding warp thread 27. At the binding location 35, the binding weft thread 26 extends between the leno warp thread 36a and the stationary warp thread 36b. Consequently, a good fixation in the binding system 25 is achieved and thus also in the reinforcing system 15 in the second portion 21. This shifting resistance can be achieved by a low thread tension in the binding system 25. In doing so, a convolution of the reinforcing threads 16, 17 in the second portion 21 has thus been avoided.

Figure 5:
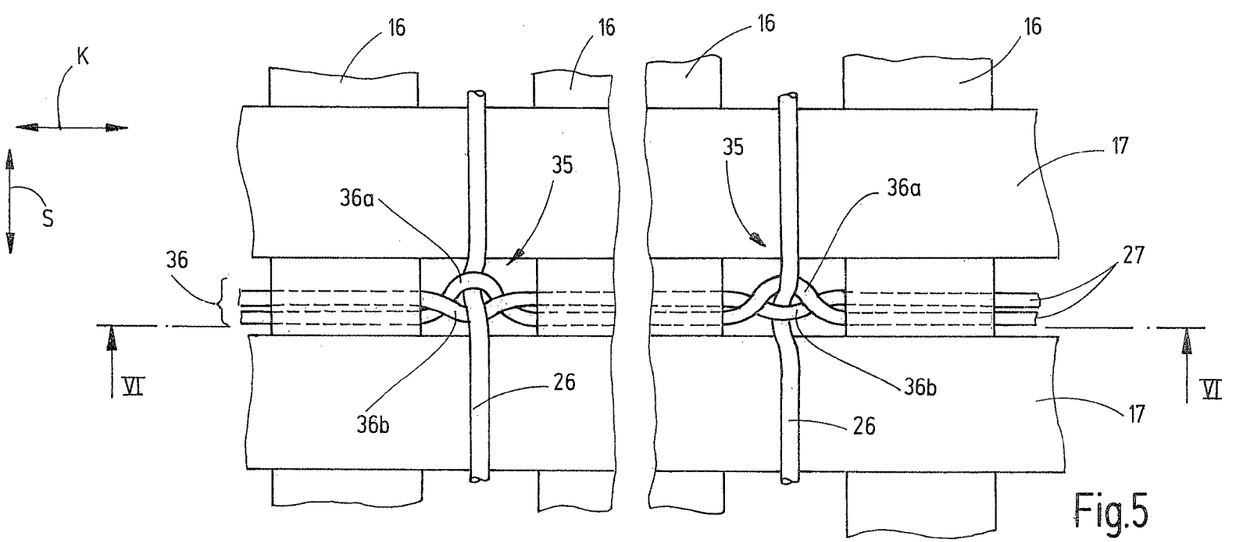
FIG. 5 a schematic plan view of the schematic representation of a binding location between the binding weft thread and the binding warp thread in the binding system.
Figure 6:
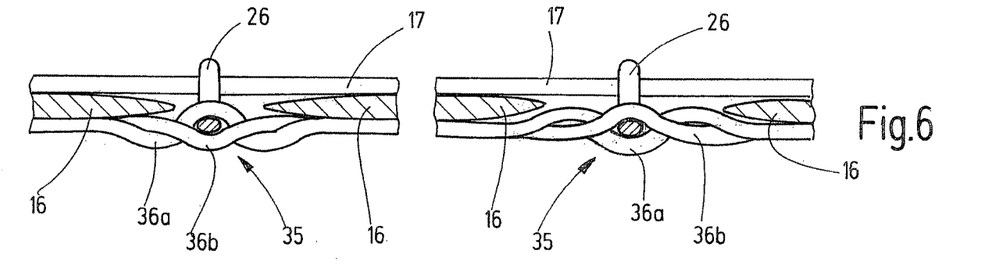
FIG. 6 the binding location as in FIG. 5, in a sectional view of the textile part, along intersection line VI-VI.

FIGS. 5 and 6 are schematic representations of one exemplary embodiment for a leno binding at the binding location 35. In doing so, the leno warp thread 36a and the stationary warp thread 36b cross at a binding location 35—one time directly in front of the binding weft thread 26 and another time directly behind the binding weft thread 26, viewed in warp thread direction K. At this binding location there is the smallest possible free space between the two adjacent reinforcing weft threads 16 and the two adjacent reinforcing warp threads 17, so that the thread crossovers do not cause convolutions in the binding system 25 in the reinforcing system 15 at the binding location 35.

Instead of the leno binding shown by FIGS. 5 and 6, the use of other binding types in the binding system 25 is also possible. Then, alternatively to the illustrated exemplary embodiments, a reinforcing warp thread may also act as the stationary warp thread 36b.

Figure 1:
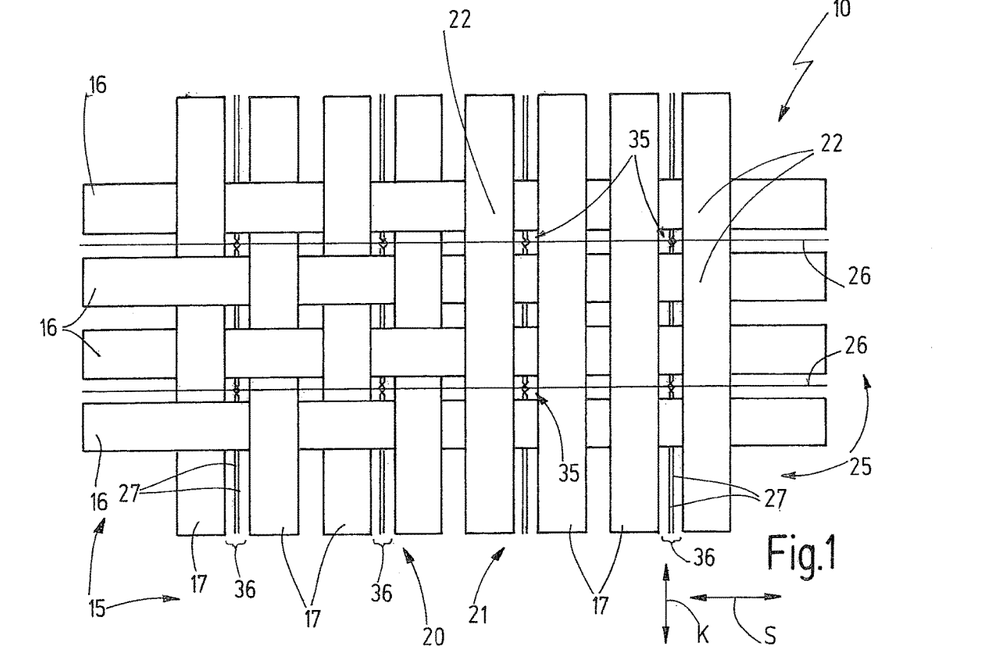
Figure 2:
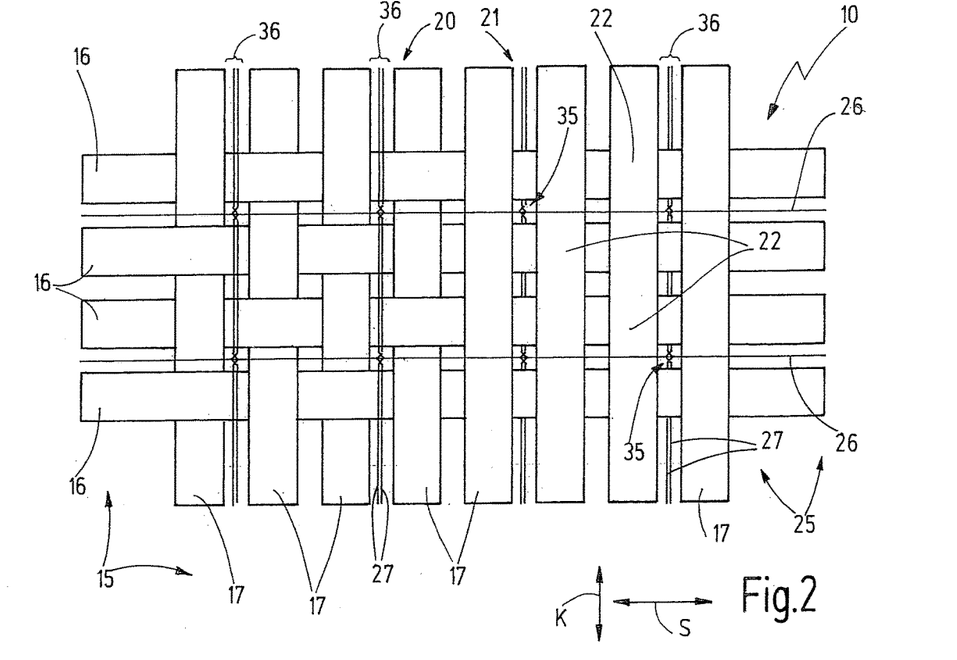
Figure 3:
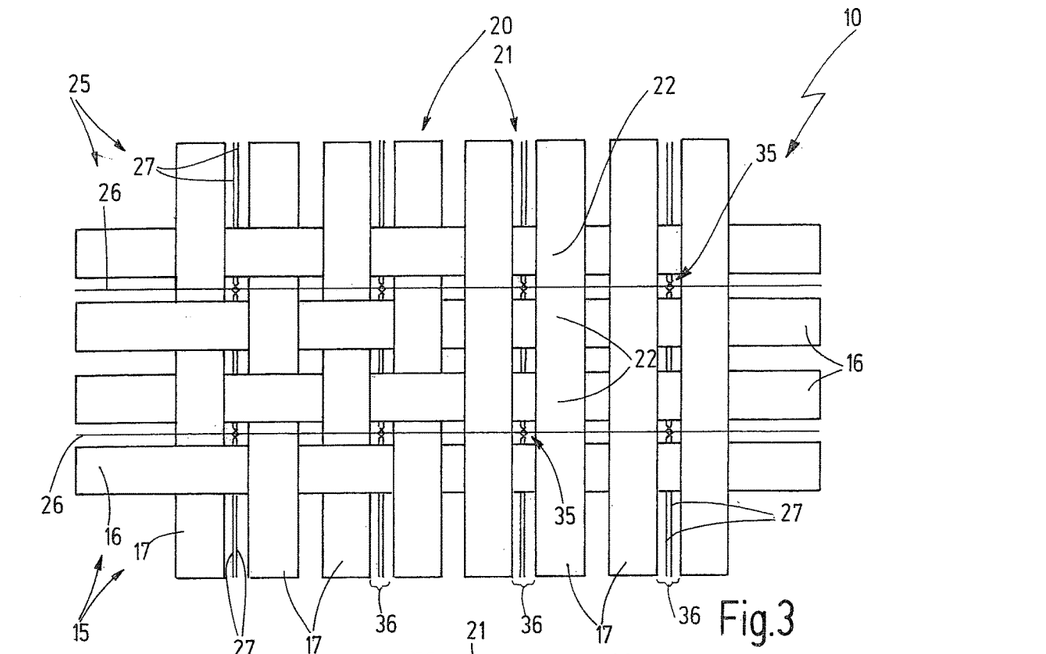

In the exemplary embodiments as in FIGS. 1 and 4, the binding system 25 edges the reinforcing system 15 also in the at least one first portion 20. This may be advantageous, for example, in the production of a preform of the textile part 10 in order to at least reduce undesirable relative shifting between the binding system 25 and the reinforcing system 15, i.e., also in the at least one first portion 20. In the exemplary embodiments as in FIGS. 2 and 3, the binding system 25 and thus also the binding weft threads 26 as well as the binding warp threads 27 in the first portion 20, abut only on one side of the reinforcing system 15, without edging it. The binding system 25 is not required for the fixation of the reinforcing warp threads 17 with the reinforcing weft threads 16 in the at least one first portion 20.

Figure 9:
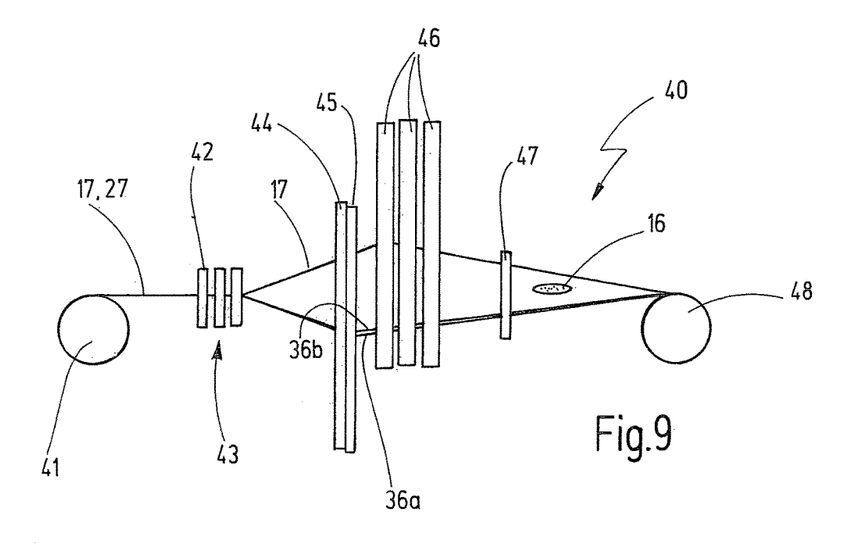
FIG. 9 the weaving machine as in FIG. 8 during the insertion of a reinforcing weft thread.

FIGS. 8 and 9 are schematic representations of a weaving machine 40 for the production of the textile part 10. The weaving machine 40 comprises a back rest 41 over which the warp threads 17, 27 are supplied. First, the warp threads 17, 27 move through a warp stop motion 42 and drop wires 43. Subsequently, several heald shafts, each with a plurality of healds, are provided, which healds can be moved up and down in vertical direction in order to open a shed. In this exemplary embodiment, the weaving machine 40 is equipped with a leno system for the production of a leno weave in the binding system 25. The usual healds and heald shafts may be employed for an alternatively usable simpler woven binding.

The stationary warp threads 36b are guided by the healds in a first heald shaft 44. The leno warp threads 36a are guided in a leno weaving harness in a second heald shaft 45. Such a leno system is described, for example in publication EP 2 063 007 A1, reference being made thereto in so far. In that case, half leno bindings are produced. However, it is also possible to use leno weaving harnesses to produce full leno bindings.

Depending on the type of binding between the reinforcing warp threads 17 and the reinforcing weft threads 16 in at least one first portion 20, several third heald shafts 4 are provided. A part of the reinforcing warp threads 17 is guided by the healds in each of the third heald shafts 46 which, for the sake of clarity, is not specifically illustrated in the schematic representations of FIGS. 8 and 9. The healds for use in the third heald shafts 46 for guiding the reinforcing warp threads 17 can be configured as described, for example, in publication EP 1 795 636 A1.

Following the heald shafts 44, 45, 46, the warp threads 17, 36a, 36b move through a reed 47 provided for the abutment of an inserted weft thread 16, 26 against a textile edge. The produced textile material is taken up and wound, respectively, by a material pull-off 48.

In the production of the textile part 10, the heald shafts 44, 45, 46 are in a prespecified shed position during weft insertion, for example in the upper shed or in the lower shed. If a first portion 20 having a linen weave is to be produced in the reinforcing system 15, every second reinforcing warp thread 17 moving through this first portion 20 is in the upper shed, and the reinforcing warp threads 17 located in between—viewed in weft thread direction S—are in the lower shed. Following each weft insertion of a reinforcing weft thread 16, the reinforcing warp threads 17 change sheds.

If, during the insertion of a reinforcing weft thread 16 a second portion 21 is to be produced, all reinforcing warp threads 17 that extend through this second portion 21 remain either in the upper shed or in the lower shed, depending on whether or not the reinforcing weft threads 16 are to be dropped below or above the reinforcing warp threads 17.

In order to bind the reinforcing system 15 in a second portion 21 or also in a first portion 20, the first weaving shaft 44 positions the stationary warp threads 36b in the upper shed as in the example. The leno warp threads 36a as well as the reinforcing warp threads 17 are positioned in the lower shed via the other heald shafts 45, 46 (FIG. 8). Depending on the produced leno binding, the leno weaving harness in the second heals shaft 45 will generate the crossover locations in front of and/or behind the binding weft thread 26.

The first portions 20 and the second portions 21 may alternate or abut against each other in warp thread direction K and/or in weft thread direction S.

Alternatively to the schematic representations of FIGS. 8 and 9, it is also possible to use a jacquard machine for the production of the textile part 10. In a jacquard machine, controllable sinkers can be used to move all the warp threads 17, 27 individually into a desired shed position, thereby allowing the production of a large variety of weave types. The production of first and second portions 20, 21 in any desired sequence and combination in warp thread direction K, as well as in weft thread direction S, is particularly simple with a jacquard machine.

Figures 10, 11:
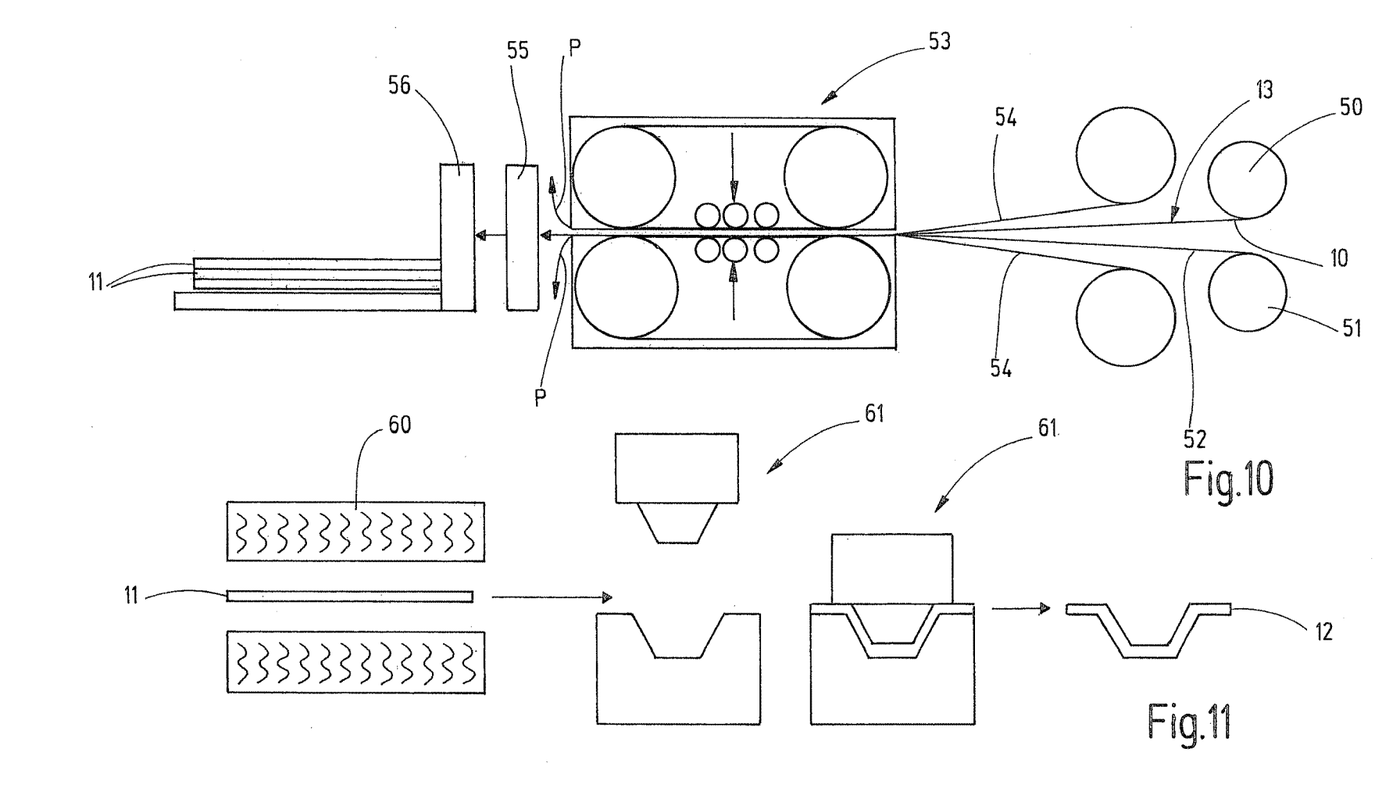
FIG. 10 a schematic representation resembling a block circuit diagram of the production of a composite material element having the shape of a sheet.
FIG. 11 a modification of the production of a composite material body from a composite material element in a highly schematized representation resembling a block circuit diagram.

With the use of the textile part 10, it is possible to produce a sheet-shaped composite material element 11 as is shown, for example, by FIG. 10. The textile part 10 is unwound from a first roll 50 in the form of a textile web to form the textile layer 13. A second roll 51 can supply a plastic film 52 to produce the composite material. The textile layer 13 and the plastic film 52 are fed, e.g., to a double belt press 53 and bonded there due to the action of pressure and/or heat to produce a composite material. In order to prevent an adhesion of the composite material to the tools of the double belt press 53, the textile layer 13 and the plastic film 52 can be arranged—upstream of the double belt press—between two protective layers 54, said layers being removed again after passage through the double belt press 53 as is indicated by the two arrows P.

Downstream of the double belt press 53 and following the removal of the protective layers 54, the composite material can be trimmed in a station 55 and be cut to the desired length in a subsequent cutting station.

As a result of this, sheet-shaped composite material elements 11 are produced, these also being referred to as organic sheets.

FIG. 11 is a schematic representation of the reshaping of a sheet-shaped composite material element 11 into a three-dimensional composite material body 12. The composite material element 11 is first heated in a heating station 60. In this heated state, the composite material element 11 is transferred to a reshaping device 61, for example a press, and imparted with the desired shape by reshaping tools. This reshaping process can also be performed in several press steps. In the desired unformed state, the composite material is cooled and finally, after cooling, removed in the form of a composite material body 12.

Figure 12:
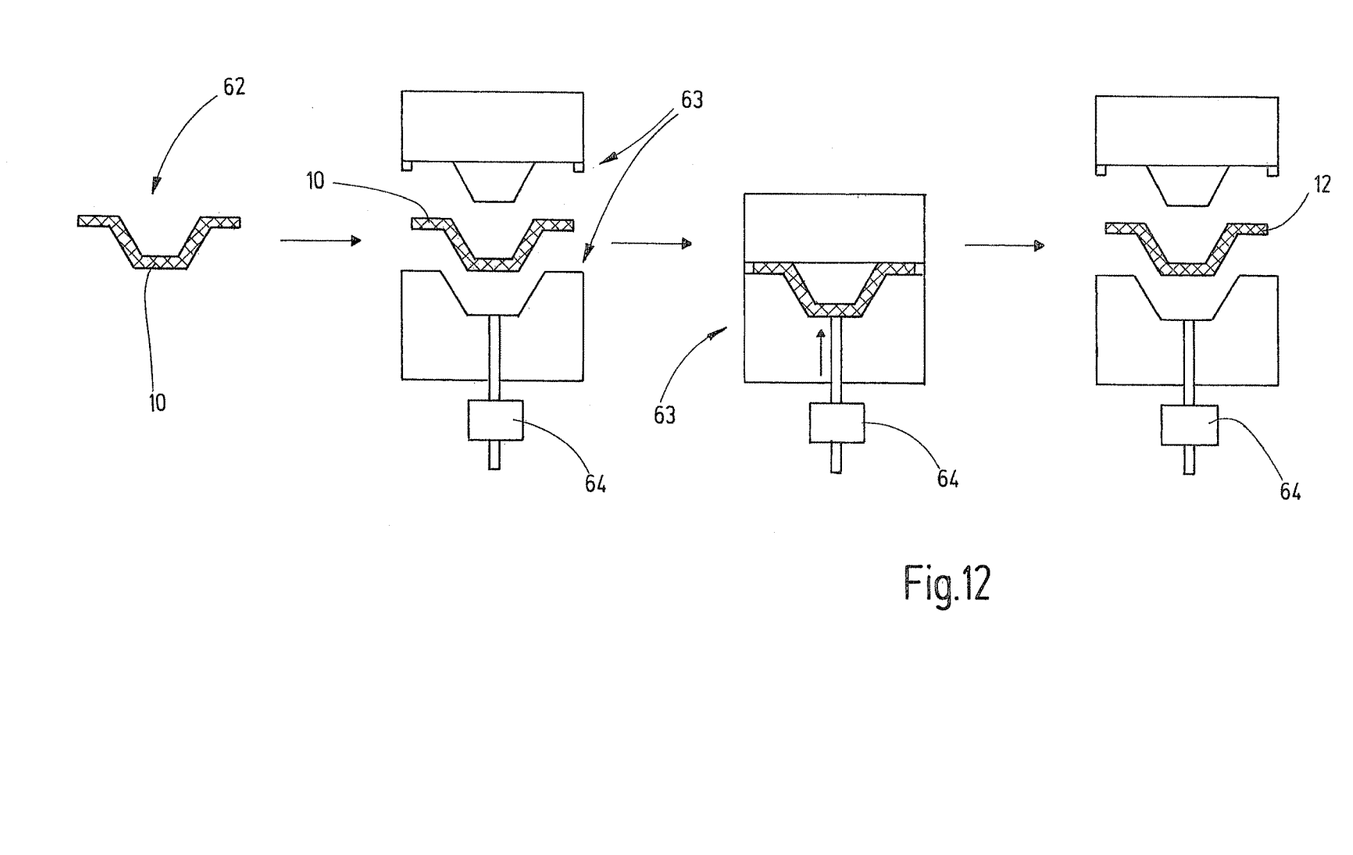
FIG. 12 another modification of the production of a composite material body in a highly schematized representation resembling a block circuit diagram.

As an alternative to this described procedure in the production of a composite material body 12, the at least one textile part 10 can also first be draped into the desired three-dimensional form, as a result of which a so-called preform 62 is produced. The reshaped textile part 10 or the preform 62 can then be set, for example by activating the hot-melt adhesive properties of the binding yarns 28 in the binding system 25 and/or with the use of an additional binder. As is shown by FIG. 12, the preform 62 can subsequently be placed into a mould 63. After closing this mould 63, a flowable plastic material, for example resin, is introduced into the mould 63. In order to bring the plastic material into the mould 63, a differential pressure is generated, for example in that the air is evacuated from the mould 63 and the flowable plastic material is pressurized, and pressed or injected into the mould. FIG. 12 is a schematic representation of an example of a valve 64 which controls the injection of the plastic material into the mould 63.

With the mould closed, the plastic material is cured and forms the plastic matrix of the composite material element 11 or the composite material body 12. While curing, the plastic material in the mould may also be subjected to pressure. After curing, the mould 63 is opened and the finished composite material body 12 can be removed. This method is also referred to as "resin transfer moulding".

Alternatively, it would also be possible to bond a preform 62 to one or more plastic films.

The present invention relates to a textile part 10 that is in particular intended and designed for the production of a composite material element 11 or a composite material body 12. The textile part 10 comprises a reinforcing system 15 of reinforcing warp threads 16 and reinforcing weft threads 17 that are made of a reinforcing yarn 18. Further present is a binding system 25 which consists of binding warp threads 27 and binding weft threads 26. The binding threads 26, 27 are made of a binding yarn 28. The reinforcing system 15 has at least one first portion 20, into which the reinforcing threads 16, 17 are directly interwoven with one another and thus undergo binding. This results in the composite material being capable of withstanding high mechanical loading in the region in which the at least one first portion 20 of the textile part 10 is arranged. Additionally, the reinforcing system 15 has at least one second portion 21, in which the reinforcing threads 16, 17 form binding-free crossover locations 22 and are preferably laid on one another in a straightened state. The reinforcing system 15 thus constitutes a laid structure in the at least one second portion 21. This laid structure is enclosed by the binding threads 26, 27 of the binding system 25. To do so, the binding warp threads 27 form a binding location 35 with the binding weft threads 26 in the at least one second portion 21, at which location said threads penetrate the reinforcing system 15. The laid structure of the reinforcing system 15, said structure being provided in the second portion 21, ensures particularly good drapability and reshaping capability in this region. The reinforcing threads 16, 17 extending straightened in this second portion result in good mechanical in-plane properties.

LIST OF REFERENCE SIGNS

10 Textile part
11 Composite material element
12 Composite material body
13 Textile layer
15 Reinforcing system
16 Reinforcing weft thread 17 Reinforcing warp thread
18 Reinforcing yarn
20 First portion
21 Second portion
22 Crossover location
25 Binding system
26 Binding weft thread
27 Binding warp thread
27 Binding yarn
28 Core
30 Coat
35 Binding location
36 Warp thread pair
36a Leno warp thread
36b Stationary warp thread
40 Weaving machine
41 Back rest
42 Warp stop motion
46 Drop wire
44 First heald shaft
45 Second heald shaft
45 Third heald shaft
47 Reed
48 Material pull-off
50 First roll
51 Second roll
52 Plastic film
53 Double belt press
54 Protective layers
55 Station
56 Cutting station
60 Heating station
61 Reshaping station
K Warp thread direction
P Arrow
S Weft thread direction

The invention claimed is:

1. A textile part (10) for use in composite materials, the textile part (10) comprising:
   a reinforcing system (15) of reinforcing warp threads (17) and reinforcing weft threads (16),
   at least one first portion (20) of the textile part and at least one second portion (21) of the textile part,
   wherein the reinforcing warp threads (17) and the reinforcing weft threads (16) in the first portion (20) of the textile part are directly bound to each other by direct weave binding,
   wherein the reinforcing warp threads (17) in the second portion (21) of the textile part are placed on the reinforcing weft threads (16), without direct weave binding with the reinforcing warp threads (17),
   wherein the second portion (21) of the textile part is bordered on several sides by one or more first portions (20) of the textile part, and/or wherein the reinforcing system (15) in the second portion (21) of the textile part is enclosed between the binding weft threads (26) and the binding warp threads (27) of a binding system (25), said binding warp and weft threads being bound together at binding locations (35).

2. Textile part (10) as in claim 1,
   wherein respectively two directly adjacent binding warp threads (27) form a stationary warp thread (36b) and a leno warp thread (36a) at the binding locations (35) in the second portion (21) of the textile part, said threads crossing each other, and wherein a binding weft thread (26) extends between the stationary warp thread (36b) and the leno warp thread (36a) at the binding location (35).

3. Textile part (10) as in claim 2,
   wherein the stationary warp thread (36b) is formed by a reinforcing warp thread (17) or by a binding warp thread (27), and that the leno warp thread (26a) is formed by a binding warp thread (27).

4. Textile part (10) as in claim 2,
   wherein the crossover locations between the stationary warp thread (36b) and the leno warp thread (36a) are located at the binding location (35) with the binding weft thread (26).

5. Textile part (10) as in claim 1,
   wherein the binding warp threads (26) and the binding weft threads (27) of the binding system (25) in the first portion (20) are located on a shared side of the reinforcing system (15).

6. Textile part (10) as in claim 1,
   wherein respectively several reinforcing warp threads (17) and several reinforcing weft threads (16) extend in the first portion (20) of the textile part and/or in the second portion (21) of the textile part.

7. Textile part (10) as in claim 1,
   wherein the number of crossover locations (22) of the reinforcing system (15) in the second portion (21) of the textile part is the same or greater than the number of the binding locations (35) in the binding system (25).

8. Textile part (10) as in claim 1,
   wherein the reinforcing warp threads (17) and the reinforcing weft threads (16) in the second portion (21) of the textile part are arranged in a straightened manner.

9. Textile part (10) as in claim 1,
   wherein the reinforcing warp threads (17) and the reinforcing weft threads (16) of the reinforcing system (15) are made of a reinforcing yarn (18) and the binding weft threads (26) and the binding warp threads (27) of the binding system (25) are made of a binding yarn (28), wherein the binding yarn (28) has a cross-section that is smaller or has titer lower than that of the reinforcing yarn (18).

10. Textile part (10) as in claim 9,
    wherein the binding yarn (28) has a core (29) and a coat (30) enclosing the core (29), wherein the core (29) has a higher melting temperature than the core (30).

11. Textile part as in claim 1, further comprising:
    a textile layer (13) comprising the textile part, and
    a plastic material that is bonded to the textile layer (13).

12. Method for the production of a textile part (10) for use in the composite materials, said method comprising:
    loading a weaving machine (40) with reinforcing warp threads (17) and binding warp threads (27), as well as reinforcing weft threads (16) and binding weft threads (26),
    inserting of the reinforcing weft threads (16) and the binding weft threads (26) in a prespecified sequence,
    wherein, during a weft insertion with a reinforcing weft thread (26) corresponding to a binding type, one part of the reinforcing warp threads (17) extending through a first portion (20) is located in an upper shed and an other part is located in a lower shed, and wherein, during a weft insertion with a reinforcing weft thread (16), all the reinforcing warp threads (17) extending through a second portion (21) are always located in the same upper shed or lower shed,
    wherein, during a weft insertion with a binding weft thread (26), the reinforcing warp threads (17) extending through the first portion (20) are respectively located in the same upper shed or lower shed, and wherein, with a weft insertion with a binding weft thread (26), the reinforcing warp threads extending through the second portion (21) are respectively in the same upper shed or lower shed, and, corresponding to the binding type, at least one part of the binding warp threads (27) extending through this second portion (21) is located in a respectively other shed, wherein the method results in the textile part comprising:
- a reinforcing system (15) of the reinforcing warp threads (17) and the reinforcing weft threads (16),
- the first portion (20) of the textile part and the second portion (21) of the textile part,
- wherein the reinforcing warp threads (17) and the reinforcing weft threads (16) in the first portion (20) of the textile part are directly bound to each other by direct weave binding,
- wherein the reinforcing warp threads (17) in the second portion (21) of the textile part are placed on the reinforcing weft threads (16), without direct weave binding with the reinforcing warp threads (17),
- wherein the second portion (21) of the textile part is bordered on several sides by one or more first portions (20) of the textile part, and/or wherein the reinforcing system (15) in the second portion (21) of the textile part is enclosed between the binding weft threads (26) and the binding warp threads (27) of a binding system (25), said binding warp and weft threads being bound together at binding locations (35).

13. Method for the production of a composite material element, comprising:
receiving of a textile part (10), comprising:
- a reinforcing system (15) of reinforcing warp threads (17) and reinforcing weft threads (16),
- at least one first portion (20) of the textile part and at least one second portion (21) of the textile part,
- wherein the reinforcing warp threads (17) and the reinforcing weft threads (16) in the first portion (20) of the textile part are directly bound to each other by direct weave binding,
- wherein the reinforcing warp threads (17) in the second portion (21) of the textile part are placed on the reinforcing weft threads (16), without direct weave binding with the reinforcing warp threads (17),
- wherein the second portion (21) of the textile part is bordered on several sides by one or more first portions (20) of the textile part, and/or wherein the reinforcing system (15) in the second portion (21) of the textile part is enclosed between the binding weft threads (26) and the binding warp threads (27) of a binding system (25), said binding warp and weft threads being bound together at binding locations (35);

receiving of a plastic material (52),
binding the textile part (10) to the plastic material (52) to produce a sheet-shaped composite material element (11).

14. Method as in claim 13, further comprising heating the planar composite material element (11) reshaping into a three-dimensional composite material body (12) in heated state, and subsequently cooling the reshaped copy the heated planar composite material element (11).

15. Method as in claim 13, further comprising placing the textile part (10) in a mould, draping the textile part, and, subsequently, injecting the plastic material into the mould.

16. Method as in claim 12 further comprising:
- forming a reinforcing system (15) of reinforcing weft threads (16) and reinforcing warp threads (17) that are interwoven in the first portion (20), and
- placing in the second portion (21), the reinforcing weft threads (16) without direct weave binding on the reinforcing warp threads (17) and by being enclosed by a binding system (25) of the binding weft threads (26) and binding warp threads (27).

* * * * *